United States Patent Office 3,179,251
Patented Apr. 20, 1965

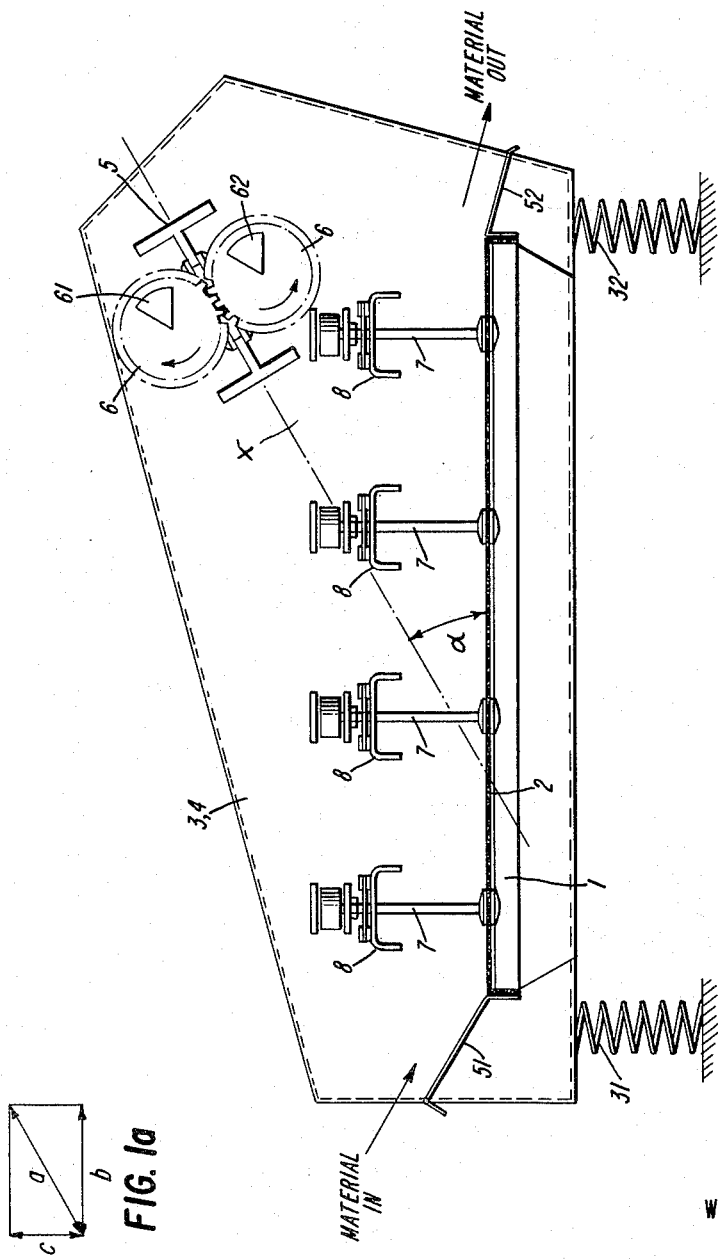

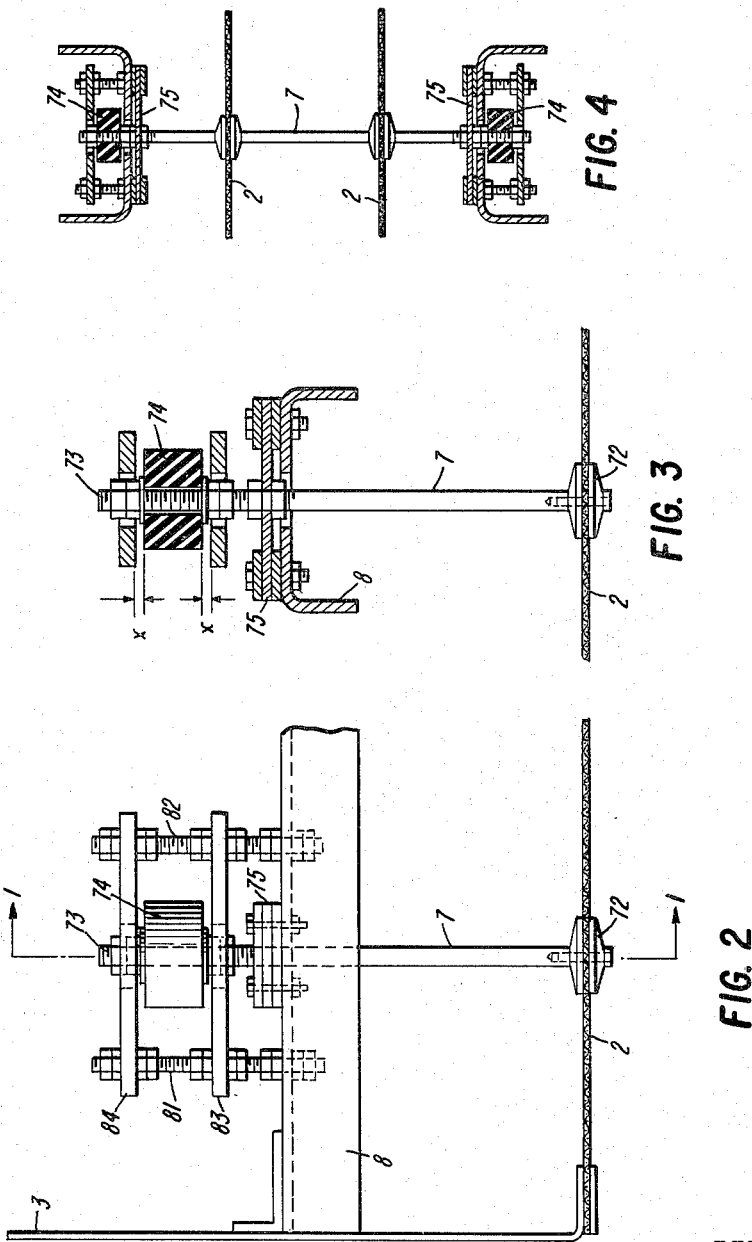

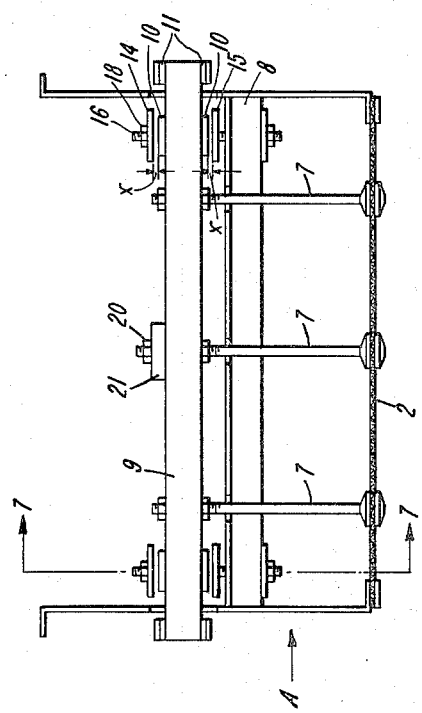

3,179,251
SIEVE MACHINE
Werner Nickel, Dortmund-Brackel, Germany, assignor to Schuchtermann & Kremer-Baum Aktiengesellschaft fur Aufbereitung, Dortmund, Germany, a German corporation
Filed July 7, 1961, Ser. No. 142,464
9 Claims. (Cl. 209—325)

The invention concerns a sieve machine, whose sieve-box, supported on insulating springs, is excited to oscillations by a drive, and in which the sieve-cover is preferably attached over a frame.

In the screening of difficult to classify, particularly moist or sticky materials, there always exists the problem of keeping the sieve openings free and unclogged. Simultaneously, in order to be able to maintain an economical operation, the throughput capacity must have a minimum height, however, without the selectivity suffering in connection with the high throughput capacity.

Sieve devices are known which are caused to be oscillated by a shaking drive or a reciprocating agitator. Further there have been described sieve devices, in which the frame serving for the attachment of the sieve mesh, remains at rest, while merely the sieve mesh is caused to be oscillated. For this purpose, there are used oscillation transmitters, which transit onto the sieve oscillation impulses directed perpendicularly to the sieve surface, by means of rigid inflexible connecting elements. In these devices the range of oscillation frequencies and accelerations are relatively high, since they are operated with small oscillating masses. In all of the known devices wherein the oscillations are directed perpendicularly to the sieve surface, there are available for the transportation of the materials to be classified only small forces. Therefore, with these known machines no high throughput capacities are obtainable with sufficient selectivity.

There has also been described a device for the classification of granular materials utilizing the aid of oscillating sieve surfaces, in which, in addition to the oscillations directed perpendicular to the sieve surface, additional oscillations are imparted to act in the direction of material transportation onto the sieve mesh. Independent of this form of construction or in connection therewith, the sieve surface of such machines may be inclined in order to obtain higher transportation speeds. However, as a rule, this occurs at the expense of the selectivity; furthermore, these sieves require a larger operating space.

Furthermore, the known machines have the disadvantage that they are very expensive, particularly with regard to their drive means. The drive means incidentally represent an increased source of disturbance, tending to decrease the safety of operation.

In the sieve machine in accordance with the invention, a sieve box is supported on insulating springs and has oscillations imparted thereto, wherein the sieve covering or mesh is preferably attached over a frame arranged in the box. In accordance with the invention, oscillation bodies, limited in the scope of their movement, for example, through flexible buffers, are distributed over the sieve surface, and connected with it. The bodies are maintained with respect to the oscillation drive so that they oscillate in the fundamental-frequency or in an upper-frequency in response to operation of the drive. In the sieve machine in accordance with the invention, by means of a relatively small and simple oscillation imparter, the transportation oscillations, as well as the oscillations directed perpendicular to the sieve surface can be imparted. Thereby the construction is simplified and, above all, the oscillation imparters and the oscillation bodies in accordance with the invention nevertheless result in the same effect on the screening—i.e., on the sieve surface, as those which are driven directly by small oscillation imparters. Thus, the oscillation bodies practically represent secondarily oscillation imparters.

It is favorable to connect the oscillation bodies with guide means, which admit only of one form of movement, preferably and at least approximately perpendicular directed movement of the oscillation bodies with respect to the sieve surface.

The invention further may be understood by reference to the drawing wherein an embodiment is disclosed in greater detail.

FIG. 1 is a schematic view, in elevation, of a device according to the invention, with parts broken away to better illustrate the instruction;

FIG. 2 is an end view, in elevation, of a portion of the device shown in FIG. 1;

FIG. 3 is an enlarged elevation view of a portion of the device shown in FIG. 2;

FIG. 4 is a view corresponding to FIG. 3, for an alternative form of apparatus according to the invention;

FIG. 5 is an end elevation view showing an alternative form of the apparatus of the invention;

FIG. 6 is a side elevation view of a portion of the equipment shown in FIG. 5, and is for viewing the apparatus in the direction of the arrow A shown in FIG. 5; and FIG. 7 is a view taken along line 7—7 in FIG. 5.

The sieve shown in FIG. 1 possesses a sieve frame 1, in which the sieve covering or screen 2 is attached. The sieve frame 1 sits on a sieve box, which substantially consists of the lateral side pieces 3, 4, the traverse member 5, the intake bottom 51 for the charge material, and the outlet bottom 52 for the oversize particles. The traverse member 5 connects with the side pieces 3, 4 and carries the swinging drive or oscillator 6, for example an unbalance exciter with 2 unbalance masses 61, 62, rotating opposite to each other and synchronized, as it is shown, for example, in the C. S. Lincoln et al. Patent No. 2,144,382. The oscillator is thus positioned on the traverse rail, that its swinging axis X lies in angle α to the sieve covering. Thereby the swinging movement $a$ is imparted to the sieve box. The horizontal movement component $b$ as a rule lies parallel to the level of the sieve covering, and substantially serves for the progressive motion of the material on the sieve covering. The vertical movement component $c$ serves for the loosening of the material and improves the efficiency of the sieve and the sieve capacity, particularly for moist material. The sieve box is elastically seated on the supporting spring 31, 32.

Above the sieve netting 2, carriers 8 are attached at the sieve box, which may run longitudinally or transversely to the longitudinal axis of the sieve box. At the carriers 8 a large number of swinging drives or oscillating bodies 7 are positioned which are uniformly distributed over the sieve surface. Depending on the quantity and nature of the charge material, one or several rows of oscillating bodies can be provided.

The construction, conduct and seating of the oscillating bodies 7 is shown in FIG. 2 and FIG. 3 on a larger scale. Each additional swinging drive is substantially an elongated body or pestle 7, perpendicular to the sieve covering 2 which is solidly connected at its free end 72 with the sieve covering 2, and which carries at its other free end 73 one or several rubber buffers 74. The rubber buffer 74 is, with clearance, between two stops 83, 84 which are attached by means of the screwbolts 81, 82 at the carrier 8 and adjustable, by means of the indicated nuts, for the adjustment of the clearance X. For straight line conduct of the pestle 7, guide means are provided, for example, guiding springs 75 connected on the one hand with pestle 7, and on the other, with the carrier 8. Thus, each oscillating body is a swinging system, which consists of the mass of the pestle 7 and the buffer spring 74, and may swing perpendicular to the level of the sieve covering 2. This swinging system is modulated, through corresponding proportioning of its measurements and of its spring characteristic, to the base frequency of the swing drive 6, so that it is excited to oscillation by the vertical component c of the movement occasioned by the oscillator 6, through resonance.

The invention may be used to advantage also in so called double or multi-deck sieves. See FIG. 4. Buffers 74 are positioned above and below the sieve surfaces. However, for two or more sieves, a buffer on but one side can be used. A guide rod corresponding to the guides 75 can then be provided on the other side of the sieves.

The operation of the new sieve machine is as follows: After switching-on of the oscillator 6, the sieve is put into swinging in the direction of motion a. In this swinging movement also participate the swinging systems or oscillating bodies 7, 74, engaging at the sieve covering 2. Since, as described, these oscillating bodies oscillate perpendicular to the sieve covering, and are modulated to the base frequency of the oscillator 6, they are excited through the vertical component c of the oscillator a to the resonant oscillation with the base frequency of the oscillator 6. These oscillations of the oscillating systems 7, 74, produced through resonance, are transferred directly via the fasteners 72, onto the sieve. Through the buffer clearance X therein result inharmonious oscillations of the sieve, which are characterized through arresting of the buffers 74 on the stops 83, 84, upon impact of the buffers and the stops. Hereby the sieve is kept free from cakings even with very moist material. The amplitude of the oscillating systems 7, 74 may be adjusted through adjustment of the buffer clearance X, according to the requirements. The abruptness of the arresting which the oscillating systems 7, 74 undergo in the impacting on the stops 83, 84 is dependent on the selection of the buffers 74, with respect to their characteristic spring line. As a rule, the buffers 74 consist of rubber or rubber like elastic materials. Of course, one may also use spring buffers and the like.

In the embodiment of FIGS. 5–7, several pestles 7 are connected with one another by a rail 9, and therefore form with the rail a uniform oscillating mass. Here each pestle need not be allotted a buffer and a steering spring. Rather, it suffices, if a limited number of buffer springs 10 are fastened at the rail 9, and the rail is conducted through steering springs 11, in the direction of swinging, perpendicular to the sieve surface 2. The steering springs may, as FIG. 6 shows particularly distinctly, be attached on the one hand at the free ends of the rail 9, and on the other by means of the carrier piece 12 inside or outside at the sieve box side pieces 3 and 4.

In the attachment of the steering springs 11, shown in FIGS. 5 and 6, outside at the sieve box side pieces, the ends of the rail 9 are conducted at the outside through openings 13 in the side pieces.

The buffer springs 10 are in the same manner, as already described with respect to the buffer springs 74, attached at the carrier 8, with clearance X, between two stops 14, 15, by means of the screw bolts 16, 17 and are adjustable, by means of the nuts 18, 19, for the adjustment of the clearance X. Furthermore, it will be desirable to construct the pestles 7, so that through simple screw fastenings 20, additional masses 21 may be connected with them, in order to be able to modulate the swinging masses in simple manner to the given conditions.

I claim:
1. A sieve machine comprising:
   (a) a resiliently mounted sieve box and a sieve screen resiliently mounted therein for vertical reciprocating movement with respect thereto;
   (b) an oscillator operatively connected to the box for imparting reciprocating oscillation thereto with a component of oscillation perpendicular to the plane of the screen;
   (c) a plurality of elongated oscillating bodies distributed on at least one side of the sieve surface, each of said bodies being rigidly secured at one portion thereof to the screen for movement of the oscillating body in direction perpendicular to the screen in response to movement of the screen and being connected at another portion thereof to said box with a resilient connection attuned to impart sympathetic vertical vibrations to the screen upon oscillation of the box, each of said bodies having a first buffer element secured thereto at a locus spaced from its rigid connection to the screen, the mass of each oscillating body being attuned to the oscillator so that it oscillates in a fundamental frequency or in an upper frequency thereof in response to operation of the oscillator;
   (d) a second buffer element connected to said box for abutting engagement with each of said first buffer elements to abruptly arrest terminal movement of the screen during operation of the sieve machine.

2. A sieve machine according to claim 1, said resilient connection of the oscillating bodies maintaining movement of the oscillating bodies perpendicular to the screen.

3. A sieve according to claim 1, and means for adjusting the first and second buffer elements with respect to each other to permit adjustment of the normal clearance therebetween, the oscillating bodies operating as unharmonic oscillators.

4. A sieve according to claim 1 and including at least two sieve screens, said screens being disposed in overlying relation, each of the said elongated oscillating bodies being rigidly secured to each of the screens.

5. A sieve according to claim 4, the said first and second buffer elements for each elongated oscillating body forming a buffer pair disposed on one side of the screens, each of said oscillating bodies having a second buffer pair as aforesaid, said second pair being disposed on the other side of the screens.

6. A sieve machine comprising:
   (a) a resiliently mounted sieve box and a sieve screen resiliently mounted therein for reciprocating motion with respect thereto;
   (b) an oscillator for imparting oscillation to the sieve operatively mounted on the said box, said oscillator imparting to the box a reciprocation motion having a component of oscillation perpendicular to the plane of the screen for reciprocating the screen for sieving;
   (c) at least one elongated oscillating body, said oscillating body being rigidly secured at one portion thereof to the screen for movement thereof in direction perpendicular to the screen in response to movement of the screen, and being connected at another portion thereof to said box with a resilient connection attuned to impart sympathetic vertical vibrations to the screen upon oscillation of the box, said body having a first buffer element secured thereto at a locus spaced from its rigid connection to the screen, the mass of each oscillating body being attuned to the oscillator so that it oscillates in a fundamental frequency or in an upper frequency thereof;
   (d) a second buffer element connected to said box for abutting engagement with said first buffer element to abruptly arrest terminal movement of the screen during operation of the sieve machine.

7. A sieve machine according to claim 6, and mounting means providing said oscillator on said box for imparting to the box a reciprocating motion having a component perpendicular to the plane of the screen and a component in the direction of the plane of the screen for advancing material over the screen.

8. A sieve machine comprising a resiliently mounted sieve box, a sieve screen mounted in said box for vertical reciprocating movement with respect thereto, an oscillator operatively connected to the box for imparting oscillating impulses to the box in the direction forming an acute angle with the surface of said screen, said screen being mounted in said box by a group of elongated connecting members extending perpendicular to the screen and connected at one portion to the screen and connected at another portion to said box with a resilient connection attuned to impart sympathetic vertical vibrations to the screen upon oscillation of said box the mass of said connecting members being attuned to the oscillator so that they oscillate in a fundamental frequency or in an upper frequency thereof, and buffer means for abruptly arresting terminal vertical movement of the screen rendering the same unharmonic.

9. A sieve machine according to claim 8 in which said buffer means includes a first buffer element secured to each elongated connecting member and a second buffer element connected to said box, said second element including two members disposed one above and one below the first buffer element for abruptly arresting terminal vertical movement of said connecting members in each direction of movement thereof.

References Cited by the Examiner

UNITED STATES PATENTS

| | | | |
|---|---|---|---|
| 1,229,811 | 6/17 | Sturtevant | 209—347 X |
| 1,434,435 | 11/22 | Fraser | 209—347 |
| 1,576,616 | 3/26 | Pharo | 209—330 X |
| 1,632,927 | 6/27 | Shackelford. | |
| 2,729,332 | 1/56 | Gruner | 209—329 |
| 2,880,871 | 4/59 | Bruninghaus | 209—310 |
| 3,024,912 | 3/62 | Jakobs | 209—310 X |

FOREIGN PATENTS

| | | |
|---|---|---|
| 518,185 | 2/40 | Great Britain. |
| 612,987 | 5/35 | Germany. |
| 1,041,332 | 10/58 | Germany. |

NORMAN YUDKOFF, *Primary Examiner.*

ROBERT A. O'LEARY, HERBERT L. MARTIN,
*Examiners.*